(12) United States Patent
Dong et al.

(10) Patent No.: US 8,379,609 B2
(45) Date of Patent: *Feb. 19, 2013

(54) MULTIMEDIA CLIENT/SERVER SYSTEM WITH ADJUSTABLE DATA LINK RATE AND RANGE AND METHODS FOR USE THEREWITH

(75) Inventors: SuiWu Dong, Markham (CA); James Ward Girardeau, Jr., Austin, TX (US)

(73) Assignee: ViXS Systems, Inc., Toronto, Ontario (CA)

(*) Notice: Subject to any disclaimer, the term of this patent is extended or adjusted under 35 U.S.C. 154(b) by 954 days.

This patent is subject to a terminal disclaimer.

(21) Appl. No.: 11/731,319

(22) Filed: Mar. 29, 2007

(65) Prior Publication Data

US 2008/0243995 A1 Oct. 2, 2008

(51) Int. Cl.
*G06F 15/16* (2006.01)
*H04J 3/16* (2006.01)

(52) U.S. Cl. .................. 370/338; 370/278; 370/329

(58) Field of Classification Search .............. 709/231, 709/203; 370/468, 338, 474; 455/226.1, 455/226.2, 226.3, 226.4
See application file for complete search history.

(56) References Cited

U.S. PATENT DOCUMENTS

| | | | |
|---|---|---|---|
| 7,428,428 B2* | 9/2008 | Wong et al. | 455/562.1 |
| 2002/0178277 A1* | 11/2002 | Laksono | 709/231 |
| 2003/0063583 A1 | 4/2003 | Padovani et al. | |
| 2003/0128685 A1* | 7/2003 | Mahany et al. | 370/338 |
| 2003/0231655 A1* | 12/2003 | Kelton et al. | 370/468 |
| 2004/0032853 A1* | 2/2004 | D'Amico et al. | 370/349 |
| 2004/0073939 A1* | 4/2004 | Ayyagari | 725/110 |
| 2004/0125779 A1* | 7/2004 | Kelton et al. | 370/338 |
| 2004/0151122 A1* | 8/2004 | Lau et al. | 370/252 |
| 2004/0203383 A1* | 10/2004 | Kelton et al. | 455/41.2 |
| 2005/0013391 A1* | 1/2005 | Boer et al. | 375/340 |
| 2006/0056380 A1 | 3/2006 | Mitsugi et al. | |
| 2006/0133322 A1* | 6/2006 | Vannithamby et al. | 370/335 |
| 2006/0168323 A1 | 7/2006 | Kim et al. | |
| 2006/0262769 A1* | 11/2006 | Ganz et al. | 370/346 |
| 2007/0037602 A1 | 2/2007 | Shimizu et al. | |

(Continued)

FOREIGN PATENT DOCUMENTS

| | | |
|---|---|---|
| JP | 2000-261398 | 9/2000 |
| JP | 2006-155602 | 11/2005 |

(Continued)

*Primary Examiner* — Ian N Moore
*Assistant Examiner* — Thai Nguyen
(74) *Attorney, Agent, or Firm* — Garlick & Markison; Bruce E. Stuckman

(57) ABSTRACT

A circuit for use in a multimedia server module that is coupleable to a plurality of multimedia sources that produce at least one multimedia signal and that can transmit over a wireless communication path to at least one client module, the circuit includes an encoder module that encodes the at least one multimedia signal to produce an encoded signal. An RF server transceiver module produces a channel signal that includes the encoded signal, and that wirelessly transmits the channel signal at a link data rate over the wireless communication path, the RF server transceiver module including a first monitor module that generates first RF performance signals that are based on the performance of the wireless communication path, and a quality of service module that receives the first RF performance signals and adjusts both a range of the link data rate and the link data rate.

10 Claims, 7 Drawing Sheets

U.S. PATENT DOCUMENTS

| | | | |
|---|---|---|---|
| 2007/0053418 A1* | 3/2007 | Goldburg | 375/227 |
| 2007/0133021 A1* | 6/2007 | Lee et al. | 358/1.9 |
| 2007/0250900 A1* | 10/2007 | Marcuvitz | 725/141 |
| 2008/0080553 A1* | 4/2008 | Hasty et al. | 370/468 |
| 2008/0107099 A1* | 5/2008 | Dolgonos | 370/349 |

FOREIGN PATENT DOCUMENTS

| | | |
|---|---|---|
| WO | 03/107673 | 12/2003 |
| WO | WO 2004045132 A1 * | 5/2004 |

\* cited by examiner

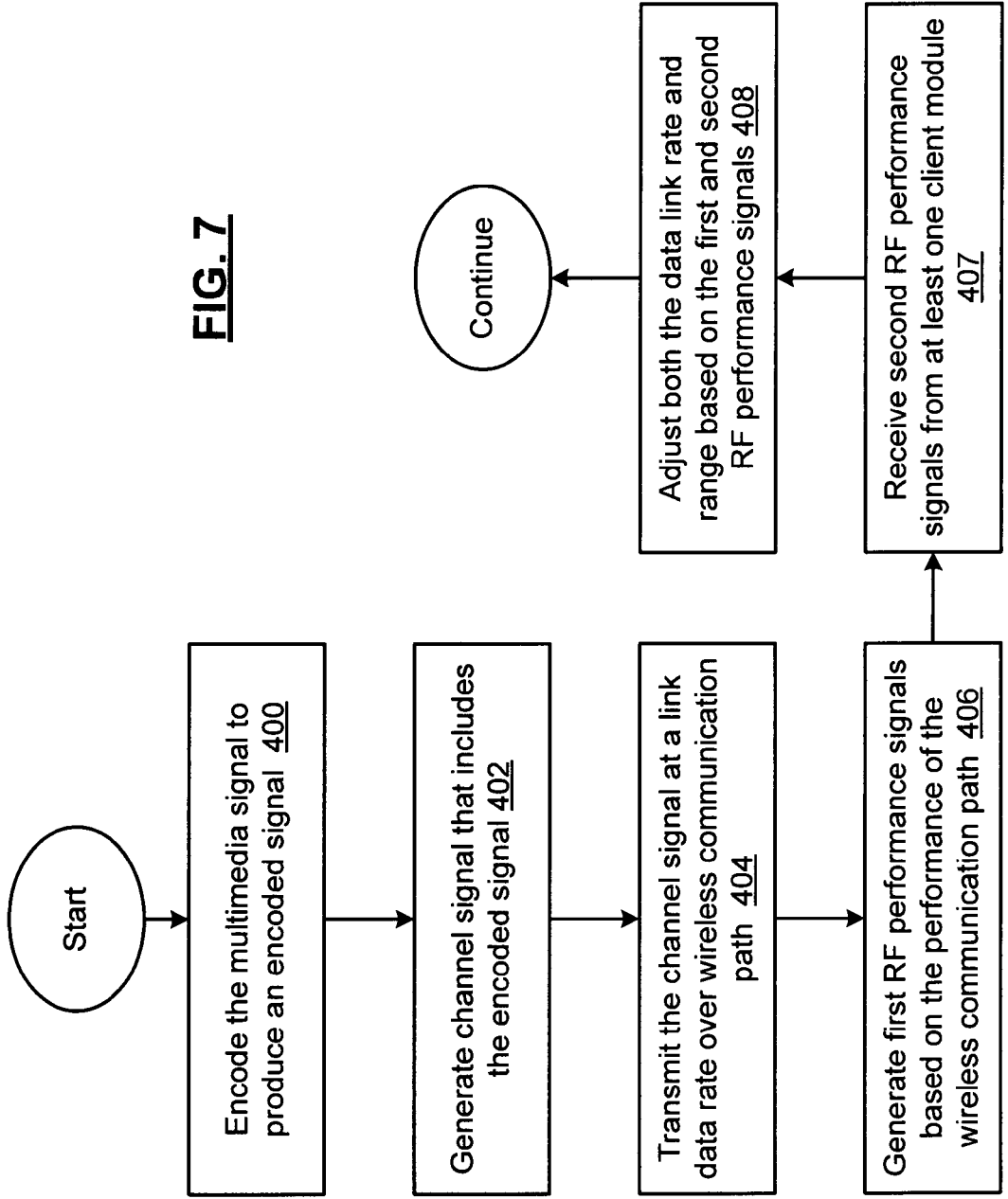

MULTIMEDIA CLIENT/SERVER SYSTEM WITH ADJUSTABLE DATA LINK RATE AND RANGE AND METHODS FOR USE THEREWITH

TECHNICAL FIELD OF THE INVENTION

This invention relates generally to wireless communication systems and more particularly to in-home local area networking for content such as multimedia.

BACKGROUND OF THE INVENTION

With the number of households having multiple television sets increasing, and many users wanting the latest and greatest video viewing services, many households have multiple satellite receivers, cable set-top boxes, modems, et cetera. For in-home Internet access, each computer or Internet device has its own Internet connection. As such, each computer or Internet device includes a modem.

As an alternative, an in-home wireless local area network (LAN) may be used to provide Internet access and to communicate multimedia information to multiple devices within the home. In such an in-home local area network, each computer or Internet device includes a network card to access a server. The server provides the coupling to the Internet. The in-home wireless local area network can also be used to facilitate an in-home computer network that couples a plurality of computers with one or more printers, facsimile machines, as well as to multimedia content from a digital video recorder, set-top box, broadband video system, etc.

When transmitting realtime signals such as video or audio signals, quality of service must be maintained between transmitting and receiving stations to avoid drop-outs or other artifacts that detract from a users enjoyment when these signals are rendered. Maintaining quality of service can be a challenge in the face of changing channel conditions.

BRIEF DESCRIPTION OF THE DRAWINGS

FIG. 7 presents a flow chart representation of a method in accordance with an embodiment of the present invention.

DETAILED DISCUSSION OF A PREFERRED EMBODIMENT

Figure 1:
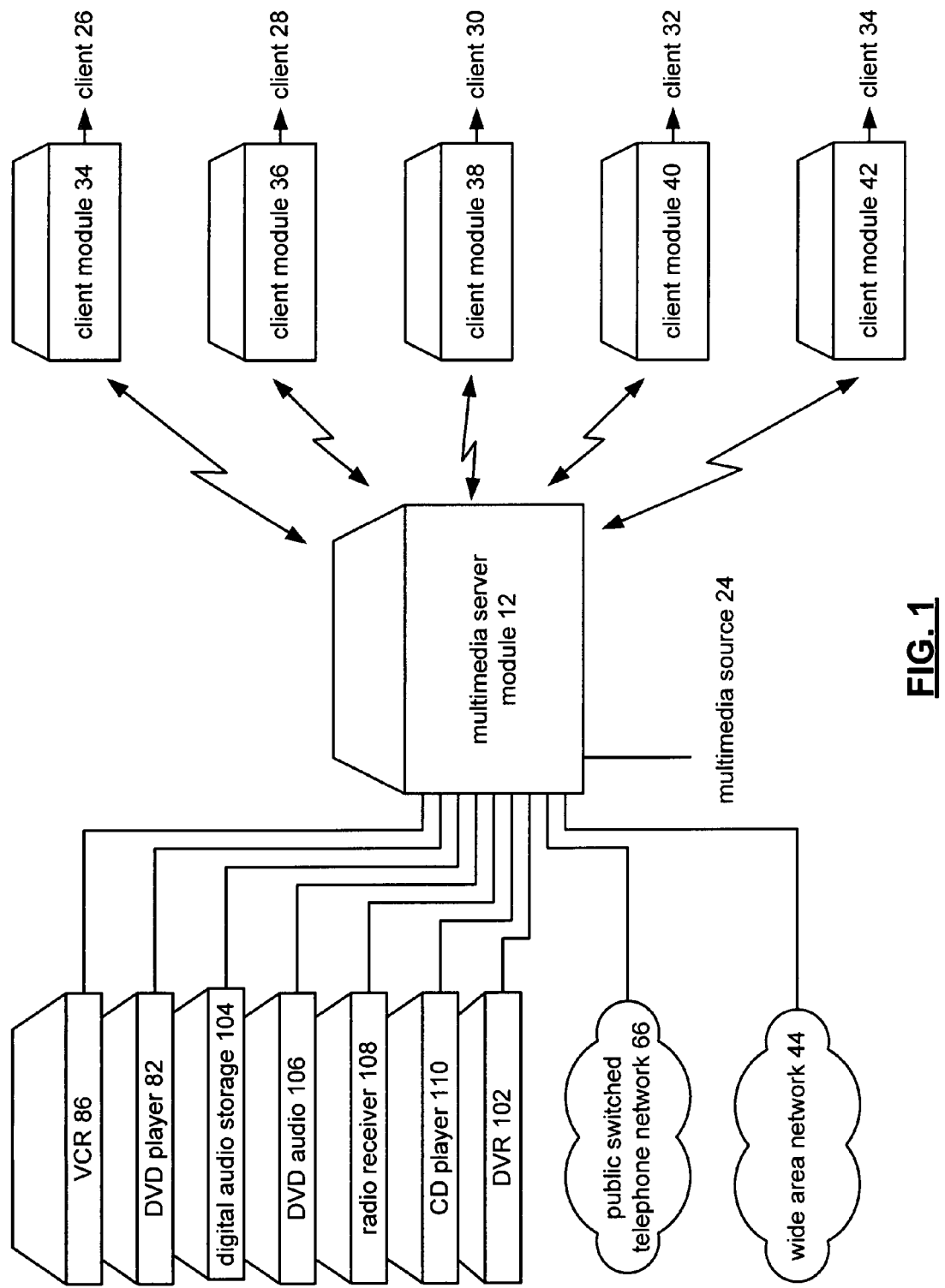
FIG. 1 presents a pictorial representation of a multimedia client server system in accordance with an embodiment of the present invention.

FIG. 1 presents a pictorial representation of a multimedia client server system in accordance with an embodiment of the present invention. The multimedia client server system includes multimedia server module 12, client modules 34, 36, 38, 40 and 42 that are coupled to clients 26, 28, 30, 32, and 34, and a plurality of multimedia sources. The multimedia sources include video cassette recorder (VCR) 86, digital video disk (DVD) player 82, digital video recorder (DVR) 102, digital audio storage device 104, DVD audio 106, radio receiver 108, CD player 110, public switch telephone network 66, wide area network 44 (such as a private network, public network, satellite network, cable network and/or the Internet) for accessing broadcast, stored or streaming audio, video and/or other multimedia content and/or any other type of audio, video and/or multimedia source 24.

In an embodiment of the present invention, the clients 26-34 may select playback from, and/or connection to, any one of the multimedia sources. The selection request from each client module would identify the desired multimedia source, the client, the desired service and any other information to assist the multimedia server module 12 in processing the request. As such, one client may be accessing the Internet, while another client is watching a satellite broadcast channel, while another is listening to a CD playback, while another is talking on the telephone, and yet another is watching a DVD playback. This is all done via the multimedia server module 12 without requiring the clients to have direct access to the multimedia sources and without the requirement that each client have its own multimedia source and/or multimedia source connection.

The multimedia server module 12 and one or more of the client modules 34, 36, 38, 40 and 42 include one or more features for increasing the reliability and quality of wireless transmission in accordance with the present invention, as will be described in greater detail in the Figures that follow, and in particular, with reference to FIGS. 2-7.

Figure 2:
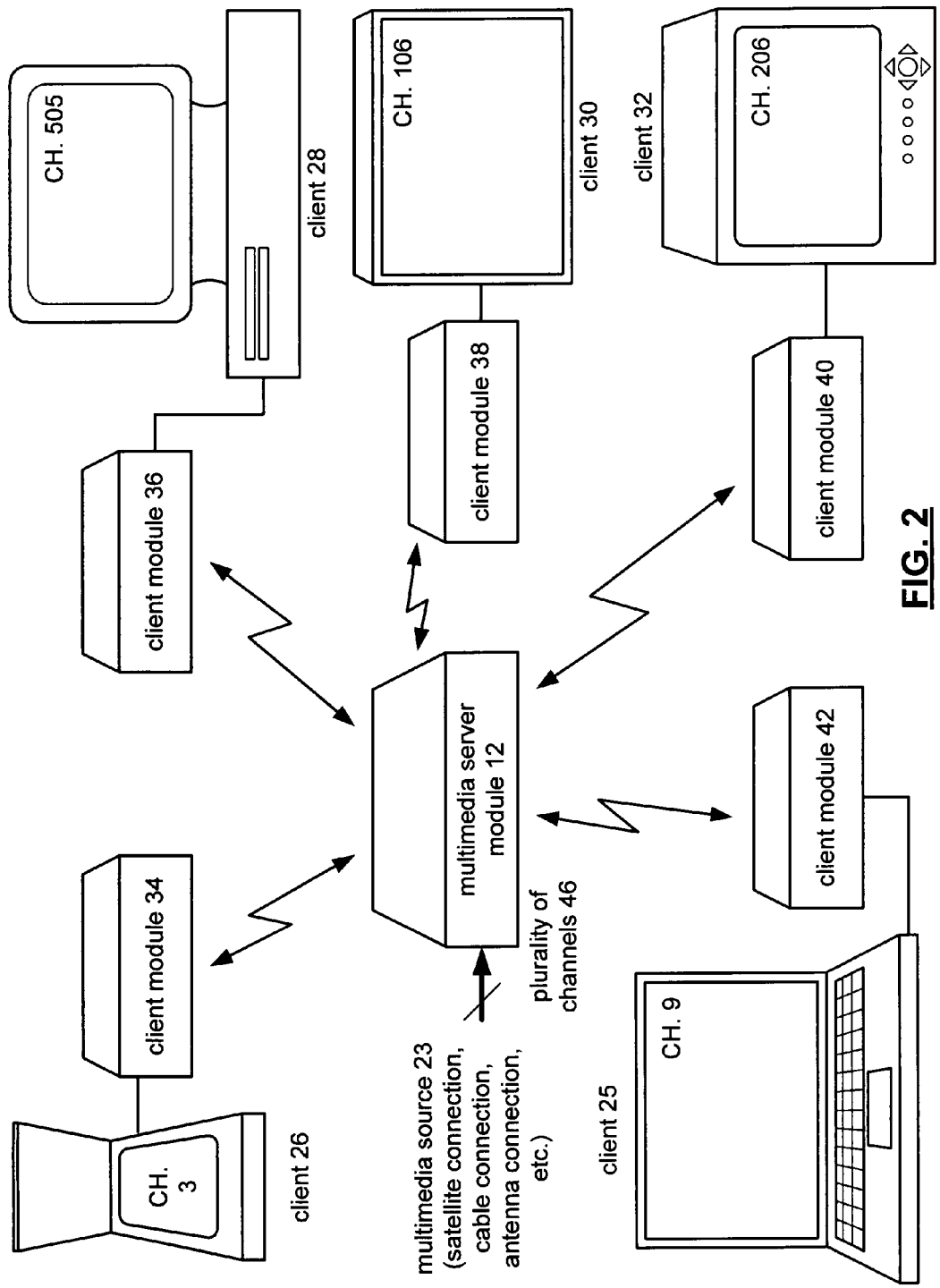
FIG. 2 presents a pictorial representation of a multimedia client/server system in accordance with an embodiment of the present invention.

FIG. 2 presents a pictorial representation of a multimedia client/server system in accordance with an embodiment of the present invention. In particular, a multimedia client/server system includes a multimedia server module 12, a plurality of client modules 34, 36, 38, 40 and 42 that are operably coupled to a plurality of clients 25, 26, 28, 30, and 32. The multimedia server module 12 is operably coupled to receive a plurality of channels 46 from a multimedia source 23. The multimedia source 23 can be a broadcast, stored or steaming multimedia signal, from a video cassette recorder (VCR) 86, digital video disk (DVD) player 82, digital video recorder (DVR) 102 digital audio storage device 104, DVD audio 106, radio receiver 108, CD player 110, public switch telephone network 66, wide area network 44 (such as a private network, public network, satellite network, cable network and/or the Internet for accessing broadcast, stored or streaming audio, video and/or other multimedia content) and/or any other type of audio, video and/or multimedia source 24. As one of average skill in the art will appreciate, the multimedia server module 12 may be a stand-alone device, may be incorporated in a satellite receiver, set-top box, cable box, HDTV tuner, home entertainment receiver, et cetera. In addition, the multimedia server module 12 may be implemented using discrete components, integrated circuits, and/or a combination thereof.

The multimedia server module 12 communicates with the plurality of client modules 34, 36, 38, 40, and 42 via a radio frequency communication path. As such, the multimedia server module 12 and each of the client modules 34, 36, 38, 40 and 42 each include a transceiver that operates to send and receive data via the communication path.

As shown, each client module is operably coupled to one of the clients. For example, client module 34 is operably coupled to client 26, which is representative of a personal digital assistant. Client module 36 is operably coupled to client 28, which is representative of a personal computer. Client module 38 is operably coupled to client 30, which is representative of a monitor (e.g., LCD monitor, flat panel monitor, CRT monitor, et cetera). Such a monitor may include speakers, or a speaker connection, control functions including channel select, volume control, picture quality, et cetera. Client module 40 is operably coupled to client 32, which may be a television set, high definition television (HDTV), standard definition television (SDTV), a home theatre system, et cetera. Client module 42 is operably coupled to client 25, which is representative of a laptop computer.

As one of average skill in the art will appreciate, each client module may be a separate device from its associated client or embedded within the client. In addition, one of average skill in the art will further appreciate that the client modules 34, 36, 38, 40 and 42 may be implemented utilizing discrete components and/or integrated circuits.

In an embodiment of the present invention, each of the clients, via its associated client module, selects one or more channels from the plurality of channels 46. As shown, client 26 has selected channel 3 of the plurality of channels for viewing. Accordingly, client module 34 relays the channel selection of channel 3 to the multimedia server module 12. The multimedia server module 12 selects channel 3 from the plurality of channels 46. The data corresponding to channel 3 is then time multiplexed with the data for the other channels and transmitted from the multimedia server module 12 to each of the client modules 34, 36, 38, 40 and 42. Client module 34 monitors the transmission from the multimedia server module 12 and extracts the data corresponding to channel 3. The extracted data for channel 3 is then provided to the client 26 for display.

Client module 36, 38, 40 and 42 perform a similar function for their associated clients 28, 30, 32 and 25, respectively. As shown, client 28 has selected channel 505, client 30 has selected channel 106, client 32 has selected channel 206 and client 25 has selected channel 9. The client modules 36, 38, 40 and 42 provide the channel selection of its respective client to the multimedia server module 12. Multimedia server module 12 extracts the selected channels from the plurality of channels for each selection request, multiplexes the data for each of the selected channels (for this example channel 3, 9, 106, 206 and 505) into a stream of data. The stream of data is then transmitted to each of the client modules. Each client module extracts the appropriate data of the selected channel for its respective client. For example, client module 36 monitors the transmitted data for data related to channel 505, client module 38 monitors for data related to channel 106, client module 40 monitors the transmission for data related to channel 206 and client module 42 monitors the transmission for data related to channel 9.

From each client's prospective, the client 25, 26, 28, 30 and 32 has independent access to the multimedia source 23. Accordingly, client 26 may at any time change its channel selection from, for example, channel 3 to channel 120. The client module 34 provides the channel selection request which may be the absence of acknowledgements to the multimedia server module 12, which now retrieves data related to channel 120 for client 36 as opposed to channel 3. As an alternate embodiment, the functionality of client modules 34, 36, 38, 40 and 42 may vary. For example, client module 34 may not provide all the independent functionality that client module 36 does. For example, client module 34 may not have independent channel selection capabilities but only selecting channels that one of the other clients have selected. Alternatively, one client module may service a plurality of clients.

Figure 3:
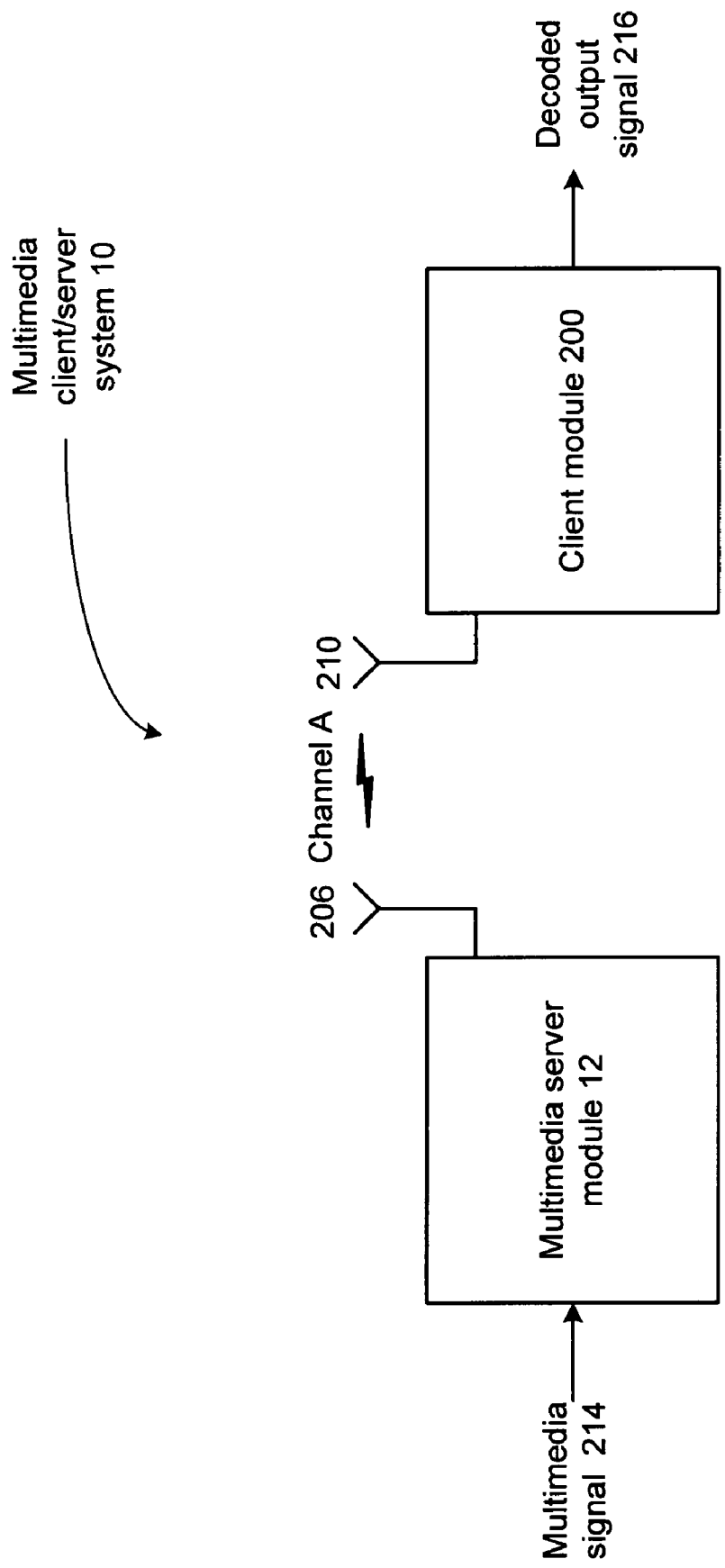
FIG. 3 presents a block diagram representation of a multimedia client/server system 10 in accordance with an embodiment of the present invention.

FIG. 3 presents a block diagram representation of a multimedia client/server system 10 in accordance with an embodiment of the present invention. In particular, the multimedia client/server system 10 includes multimedia server module 12 that transmits a multimedia signal 214, such as a broadcast, stored or streaming signal from multimedia source 23. Multimedia server module 12 transmits, via antenna 206, a radio frequency (RF) signal that contain the multimedia content from multimedia signal 214. This RF signal is transmitted at a carrier frequency corresponding to a channel such as channel A of an RF spectrum over a wireless communication path to one or more client modules such as client module 200. Client module 200, (such as client modules 34, 36, 38, 40 and 42) receives the RF signal via antenna 210 and produces a decoded output signal 216.

It should be noted that channel A represents a channel of an RF spectrum corresponding to one or more carrier frequencies. This is as opposed to channels 3, 9, 106, 206 and 505 discussed in association with FIG. 2 where "channel", is this context, was used primarily to denote different streams of multimedia content such as "The Weather Channel", "The Discovery Channel" or "Gone with the Wind". In the event that noise, interference or fading hamper the performance of one of the channels, the multimedia server module 12 can switch to a different channel.

In an embodiment of the present invention, the transmitted multimedia content can further be encrypted in the encoding process and decrypted in the decoding process, such as by RSA encryption, WEP, or protected using other secure access protocols such as MAC address filtering, so that if the content is wirelessly received by an authorized client device, the multimedia content can be otherwise protected. Multimedia server module 12 and client module 200 share secure access data during an initialization procedure in order to secure the wireless communications between these two devices.

In accordance with the present invention, the multimedia server module 12 adjusts the link data rate of the communication path and/or the range of the link data rate based on RF performance signal parameters that are measured or otherwise assessed by the multimedia server module 12 or that are received from a remote device such as one or more client modules 200. Further functions and features of the multimedia server module 12 and client module 200 including several alternative embodiments are presented in conjunction with FIGS. 4-7 that follow.

Figure 4:
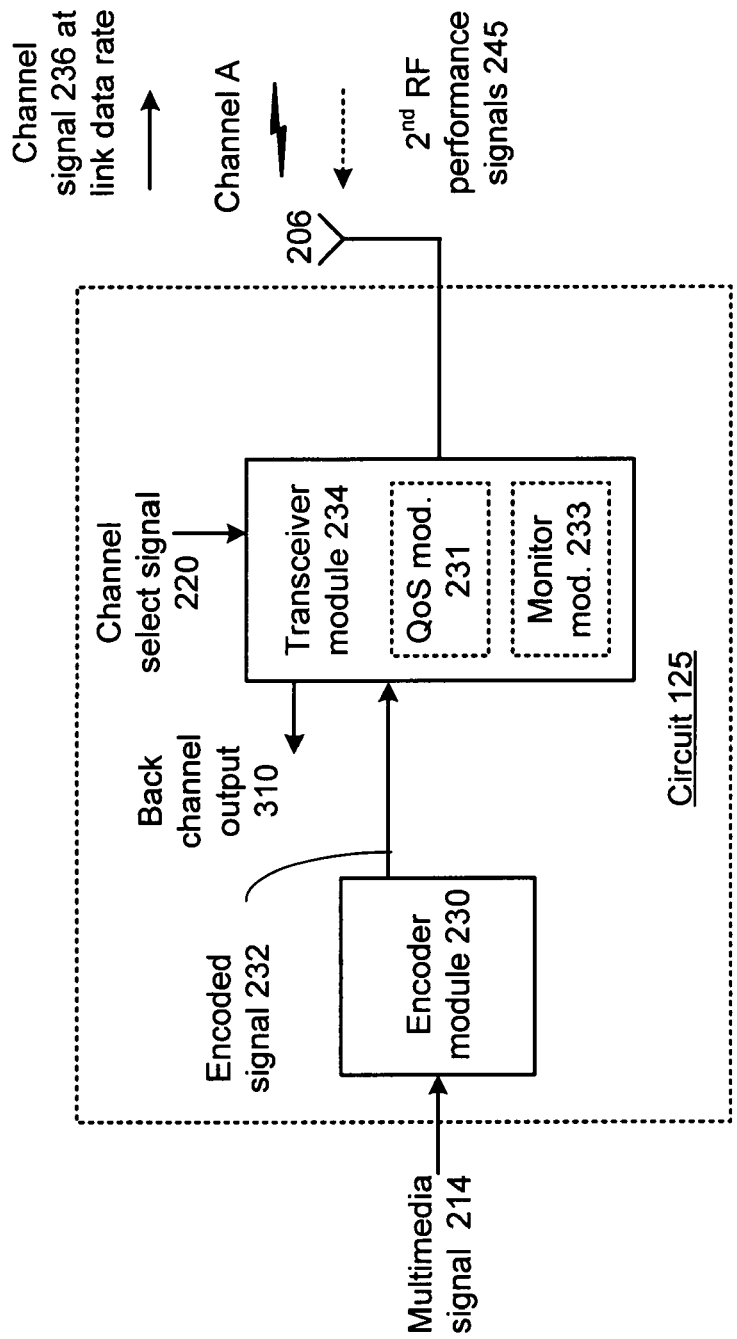
FIG. 4 presents a block diagram representation of a circuit 125 for use in multimedia server module 12 in accordance with an embodiment of the present invention.

FIG. 4 presents a block diagram representation of a circuit 125 for use in multimedia server module 12 in accordance with an embodiment of the present invention. In particular, circuit 175 includes an encoder module 230 for producing an encoded signal 232 from an unencoded or encoded multimedia input signal 214. In an embodiment of the present invention, the encoding scheme may be one or more of multilevel, multiphase and multifrequency encoding, orthogonal frequency division multiplexing OFDM, binary phase shift keying BPSK, quadrature phase shift keying QPSK, quadrature amplitude modulation such as 16 QAM, 64 QAM, 128 QAM, etc., non-return to zero encoding, Manchester encoding, block encoding including reed soloman coding and other error correcting codes, convolutional coding, LDPC coding and/or nB/mB encoding wherein n>m. For example, the nB/mB may be 4B/5B encoding where 4 bits of actual data are converted into 5 bits of encoded data.

Encoding may further include compression, transrate and transcode encoding of the multimedia signal based on the content and format of multimedia signal 214 and the bandwidth and performance of channel A. In an embodiment, the multimedia signal 214 includes an analog composite video signal that is formatted in any of a number of video formats including National Television Systems Committee (NTSC), Phase Alternating Line (PAL) or *Sequentiel Couleur Avec Memoire* (SECAM). The encoded signal 232 may be digitized, compressed, and channel coded for transmission at low data rates in weak channel conditions or higher data rates in stronger channel conditions. Alternatively, multimedia signal 214 can be already in a digital format such as a Motion Picture Experts Group (MPEG) format (such as MPEG1, MPEG2, MPEG4), a Society of Motion Picture and Television Engineers (SMPTE) standard such as VC1, H.264, Quicktime format, Real Media format, Windows Media Video (WMV) or Audio Video Interleave (AVI), or another digital video format, either standard or proprietary. In this case, the encoding performed by encoder module 230 may be limited to encoding of the data for the channel, based on the strength or quality of the channel conditions, with or without further compression.

In an embodiment of the present invention, encoder module 230 generates an encoded signal 232 from the multimedia signal 214 that is in a digital format such as an MPEG, a Society of Motion Picture and Television Engineers (SMPTE) standard such as VC1, H.264, Quicktime format, Real Media format, Windows Media Video (WMV) or Audio Video Interleave (AVI), or another digital video format, either standard or proprietary. Transceiver module 234, in turn, produces RF signal 236 that includes the encoded signal 232, and wirelessly transmits the RF signal 236 to a client device, such as through client module 200. In an embodiment of the present invention, encoder module 230 can operate as a transcoder to receive a multimedia signal 214 in a first digital format, decode this signal and re-encode it into a second digital format for transmission. For example, multimedia input 214 can include a compressed MPEG2/4 input. The encoder module 230 operates to decompress the signal and re-encode it in another format, such as H.264. In addition, encoder module 230 can receive a multimedia input signal that is in a digital format such as High-Definition Multimedia Interface (HDMI). The encoder module 230 can compress and encode the digital signal into a compressed digital format.

In an embodiment of the present invention, the non-RF portions of the transceiver module 234 and the encoder module 230 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the transceiver module 234 and/or encoder module 230 implement one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

Transceiver module 234 modulates the encoded signal 232 to produce a RF signal 236 that includes multimedia content such as a packetized video signal at a first carrier frequency and transmits the RF signal 236 over channel A using antenna 206. In addition, transceiver module 234 produces back channel output 310 based on an RF signal received from the client module 200 over channel A. While not expressly shown, multimedia server module 12 includes a decoder module, such as decoder module 254 that will be discussed in conjunction with FIG. 5, for operating the back channel in a reciprocal fashion.

In an embodiment of the present invention, transceiver module 234 is selectively tunable to a plurality of other carrier frequencies in response to channel selection signal 220. For instance, in an implementation of the multimedia server module 12 and client module 200 using wireless transmission link in the United States that conforms with the IEEE 802.11 g standard, channel A can be selected as any of the 11 allocated channels. In an embodiment of the present invention, the channel selection signals can be preprogrammed into multimedia server module 12, dynamically chosen based on a site survey that scans the available channels to determine a suitable channel for use, received from the client module 200 or arbitrated between the client module 200 and multimedia server module 12, or selected under user control. Similarly, channel A can be implemented as a channel of a broadband wireless access network that conforms to at least one of the following standards: 802.11a, b, g n or other 802.11 standard, Ultra Wideband (UWB), or Worldwide Interoperability for Microwave Access (WiMAX). Transceiver module 234 includes secure access module 231 for securing the RF communication link by optionally encrypting the encoded signal 232, password protecting the data or through other secure access protocol or methodology. While shown as part of transceiver module 234, quality of service module 231 and monitor module 233 can optionally be implemented as a stand alone module.

In operation, monitor module 233 generates RF performance signals that are based on the performance of the wireless communication path. Such signals include measurements or other indications such as transmit power level; coding error rate, such as the rate of coding error generated by a cyclic redundancy check (CRC), by other block codes that are either error detecting or error correcting codes and/or by other codes, such as convolutional codes, etc.; an air busy rate that indicates the frequency and/or occurrence of conditions when the transmitter desires to send data but determines that the channel is in use by another station; a received signal strength indication such as RSSI, signal to noise ratio, signal to interference ratio, signal power or other signal strength indication; a re-transmit rate, that indicates the frequency or occurrence of data retransmissions in response to either the lack of an acknowledgement or request for retransmission; and or other parameters indicative of the performance of the wireless communication path. Monitor module 233, monitors the conditions of transceiver module 234 and generates the RF performance signals that are passed to quality of service module 231.

Quality of service module 231 receives the RF performance signals from monitor module 233 and/or from similar monitor modules of other devices such as client module 200, or other terminals in communication with multimedia server module 12 over the wireless channel and adjusts the link data rate, maximum data rate and/or packet size based on these RF performance signals, and optionally, based on adjustments made to the data rate based on these RF performance signals or other performance parameters of local and remote transceivers such as streaming factors such as rendering and receiving buffer levels, and decoding factors such as decoding buffer levels.

In operation, quality of service module 231 operates to adjust the link data rate to maintain an acceptable level of quality for the transmission of video signals, audio signals, or other real-time multimedia communications between multimedia server module 12 and client module 200. For instance, if the coding error rate is rising, this may indicate the presence of an interfering station or other weak channel conditions and the quality of service module can lower the link data rate in response to these conditions and for the duration of these conditions. Similarly, a high air busy rate or re-transmit rate can lead to video interruptions and can require an adjustment to the link data rate. In addition, one or more RF performance signals can be used in setting the range of the link data rate, such as the maximum link data rate. In this fashion, a lower than normal RSSI can establish a lower maximum link data rate that serves to limit the rise of the link data rate, under high or rising conditions of the other RF performance signals, streaming signals, decoding signals, etc.

In an embodiment of the present invention, the quality of service module 231 includes a look-up table that stores link data rates and maximum link data rates that are indexed by possible values of the RF performance signals for each of the client modules in communication with the multimedia server module 12. In this fashion, the maximum link data rate can be found based on the RF performance signals, such as RSSI, used to impact this parameter for each client module. Similarly, the link data rate can be determined by looking up this parameter in the table based on the prevailing conditions of the remaining RF performance signals, streaming and/or decoding conditions. The values of this look-up table can be determined by multiple measurements between a multimedia server module 12 and one or more client modules 200 at varying distances and under a range of difference channel conditions in a fashion that is determined to optimize actual quality or service during these particular operating conditions for each client module.

In an embodiment of the present invention, the quality of service module 231 adjusts the link data rate based on the then current conditions on a packet-by-packet basis. In this fashion, rapid changes in channel conditions can be handled quickly on a near simultaneous basis. However, other schemes can also be employed by aggregating, averaging or filtering of either the RF performance signals or the link data rate to adapt to changing conditions or implement link data rate changes more slowly or on a more limited basis.

Figure 5:
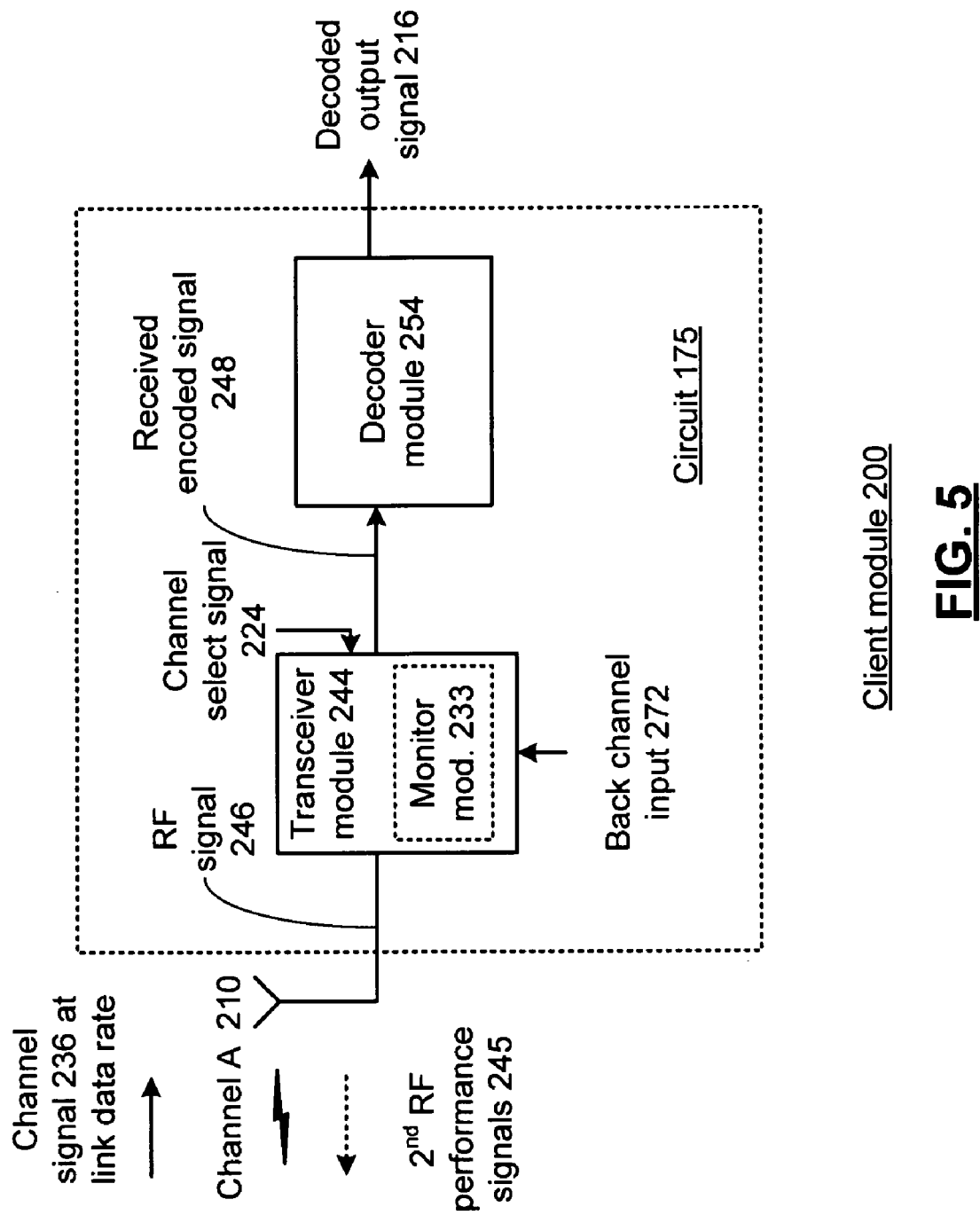
FIG. 5 presents a block diagram representation of a circuit 175 for use in client module 200 in accordance with an embodiment of the present invention.

FIG. 5 presents a block diagram representation of a circuit 175 for use in client module 200 in accordance with an embodiment of the present invention. In particular, circuit 175 includes transceiver module 244 for receiving RF signal 246 over channel A or an alternate channel selected by multimedia server module 12 and for converting the RF signal 246 into a received encoded signal 248. In addition, transceiver module 244 is operable to modulate back channel input 272 to produce RF signals sent to multimedia server module 12 over channel A. While not expressly shown, client module 200 includes an encoder module, such as encoder module 230 for operating the back channel in a reciprocal fashion.

As discussed in conjunction with FIG. 4, monitor module 233 generates RF performance signals that are based on the performance of the wireless communication path that are shared with transceiver module 244 for transmission to the multimedia server module 12. Further, quality of service module 231 is optionally operable to adjust the range of the link data rate and/or the link data rate, based on the RF performance parameters transmitted from this remote device.

In an embodiment of the present invention, multimedia server module 12 and client module 200 use a wireless transmission link that conforms with the IEEE 802.11g standard that uses a 52-subcarrier orthogonal frequency division multiplexing (OFDM) with a maximum data rate of 54 Mbits/sec. The data rate is reduced in increments in response to adverse channel conditions from 48 mbits/sec, down to as low as 6 Mbits/sec by modifying the modulation and effective coding rate from 64-quadrature amplitude modulation (64-QAM) to binary phase shift keying (BPSK). The 52 subcarriers of a channel are spaced 312.5 kHz apart, where 48 of the subcarriers carry data, and 4 subcarriers carry pilot tones. Received encoded signal 248 can be a baseband signal or a low intermediate frequency (IF) signal.

In an embodiment of the present invention, received encoded signal 248 can optionally be sent to decoder module 254 through a physical electronic connection such as Universal Serial Bus (USB), Personal Computer Interface (PCI), Firewire, or small computer service interface (SCSI), ASI (Asynchronous Serial Interface), or SPI (Serial Peripheral Interface). However, other physical electronic connections, either standard or proprietary may likewise be implemented or used within the broad scope of the present invention.

Client module 200 further includes decoder module 254 for decoding the received encoded signal 248 into a decoded output signal 216, such as in a format used by the attached client. In particular, further decoding of the data can include decompression of a compressed digital signal, formatting of a video signal as in NTSC, PAL, SECAM, etc., and other formatting to match the input format of the client device. As discussed above, transceiver module 244 receives and demodulates RF signal 246 to produce a received encoded signal 248.

In an embodiment of the present invention, the non-RF portions of transceiver module 244 and the decoder module 254 can be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital), optionally based on operational instructions that are stored in a memory that may be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the transceiver module 244 and or decoder module 254 implement one or more of its functions via a state machine, analog circuitry, digital circuitry, and/or logic circuitry based on operational instructions, the memory storing the corresponding operational instructions may be embedded within, or external to, the circuitry comprising the state machine, analog circuitry, digital circuitry, and/or logic circuitry.

In an embodiment of the present invention, transceiver module 244 is selectively tunable to a plurality of other carrier frequencies in response to channel selection signals 224. For instance, in an implementation of the multimedia server module 12 and client module 200 using wireless transmission link in the United States that conforms with the IEEE 802.11g standard, channel A can be selected as any two of the 11 allocated channels. In an embodiment of the present invention, the channel selection signals can be preprogrammed into client module 200, dynamically chosen based on a site survey that scans the available channels to determine two suitable channels for use, received from the multimedia server module 12 or arbitrated between the client module 200 and multimedia server module 12, or selected under user control.

The description above has been limited to spectrum reserved for 802.11x compliant broadband access networks, in an alternative embodiment of the present invention, other spectrum and other wireless links including Ultra Wideband (UWB), Worldwide Interoperability for Microwave Access (WiMAX) and other wireless links can likewise be implemented.

Figure 6:
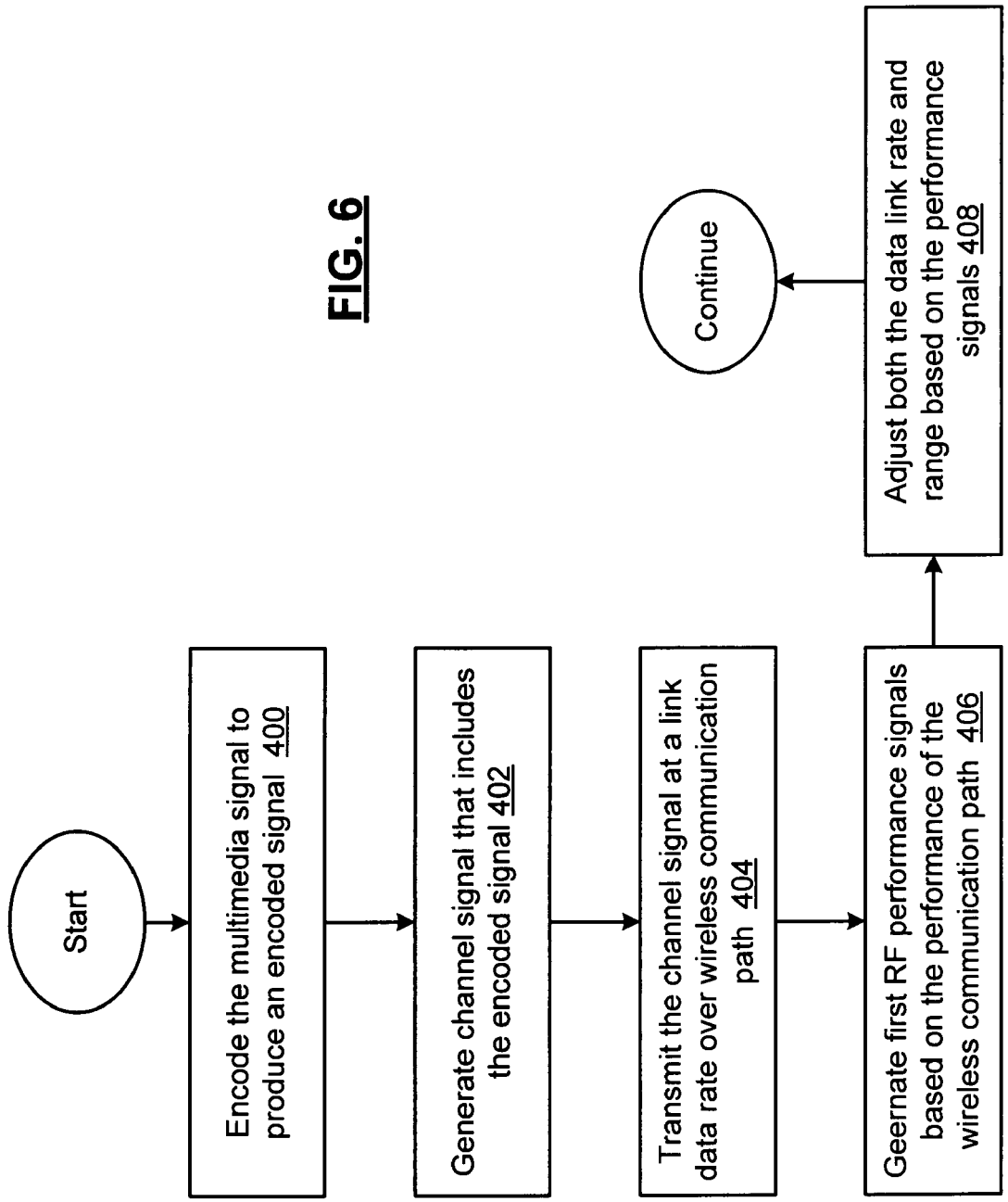
FIG. 6 presents a flow chart representation of a method in accordance with an embodiment of the present invention.

FIG. 6 presents a flow chart representation of a method in accordance with an embodiment of the present invention. In particular, a method is presented for use in conjunction with one or more of the functions and features described in association with FIGS. 1-5. In step 400, at least one multimedia signal is encoded to produce an encoded signal. In step 402, a channel signal is generated that includes the encoded signal. In step 404, the channel signal is transmitted at a link data rate over the wireless communication path. In step 406, first RF performance signals are generated that are based on the performance of the wireless communication path. In step 408, both the range of the link data rate and the link data rate are adjusted based on the first RF performance signals.

In an embodiment of the present invention, the first RF performance parameters can include RSSI, retransmission rate, air busy rate, coding error rate. Further, step 408 can be performed on a packet-by-packet basis or less frequently.

In an embodiment, step 400 encodes or transcode the multimedia signal in accordance with one of a Motion Picture Experts Group (MPEG) standard, and a Society of Motion Picture and Television Engineers (SMPTE) standard. Further, step 404 transmits the RF signal over a broadband wireless access network that conforms to at least one of the following standards: 802.11x, Ultra Wideband (UWB), and Worldwide Interoperability for Microwave Access (WiMAX).

FIG. 7 presents a flow chart representation of a method in accordance with an embodiment of the present invention. A method is presented for use in conjunction with one or more of the functions and features described in association with FIGS. 1-5. In particular, a method is presented that includes many of the elements of the method of FIG. 6 that are referred to by common reference numerals. In addition, step 407 is included of receiving second RF performance signals, that are based on the performance of the wireless communication path, from the at least one client module, and step 408 adjusts at least one of the range of the link data rate and the link data rate, based on the second RF performance parameters.

In an embodiment of the present invention, the second RF performance signals include a received signal strength indicator (RSSI), and step 408 adjusts the range of the link data rate based on the RSSI.

In an embodiment of the present invention, the various circuit components are implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or more module functions such as the processing of an input signal to produce an output signal. As used herein, a module may contain submodules that themselves are modules. When implemented in software or firmware, each module can be implemented using a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry.

Thus, there has been described herein an apparatus and method, as well as several embodiments including a preferred embodiment, for implementing a multimedia client/server system, multimedia server module, client module and quality of service module. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:
1. A multimedia client/server system comprising:
a multimedia server module, coupleable to a plurality of multimedia sources that produce at least one multimedia signal that includes streaming video, the multimedia server module including:
an encoder module that encodes the at least one multimedia signal to produce an encoded signal; and an RF server transceiver module, coupled to the encoder module, that produces a channel signal that includes the encoded signal, and that wirelessly transmits the channel signal at a link data rate over a wireless communication path, the RF server transceiver module receives streaming video performance signals that are based on a remote processing of the streaming video, and wherein the RF server transceiver module includes a quality of service module that computes a range of the link data rate that establishes a bound of variation of permissible link data rate values, adjusts the link data rate based on the streaming video performance signals within the bound of permissible link data rate values, and the further adjusts the range of the link data rate; and a client module, coupleable to at least one client device, the client module including:

an RF client transceiver module that receives and demodulates the channel signal to produce a received encoded signal and that sends the streaming video performance signals to the multimedia server module; and a decoder module, coupled to the RF client transceiver module, that decodes the received encoded signal into a decoded output signal.

2. The multimedia client/server system of claim 1 wherein RF client transceiver module further includes a monitor module that generates RF performance signals that are based on the performance of the wireless communication path, wherein the RF client transceiver module transmits the RF performance signals to the RF server transceiver module and wherein the quality of service module adjusts at least one of the range of the link data rate and the link data rate, based on the RF performance parameters, and wherein adjusting the range of the link data rate includes adjusting a difference between a maximum link data rate and a minimum link data rate that sets the bound of variation of permissible link data rate values.

3. The multimedia client/server system of claim 2 wherein the RF performance signals include a received signal strength indicator (RSSI), and the quality of service module adjusts the range of the link data rate based on the RSSI.

4. The multimedia client/server system of claim 1 wherein the RF server transceiver module transmits the encoded signal as a sequence of packets and wherein the quality of service module adjusts the link rate on a packet-by-packet basis.

5. The multimedia client/server system of claim 1 wherein the video streaming performance signals include a buffer level.

6. The multimedia client/server system of claim 1 wherein the video streaming performance signals include at least one of: a receiving buffer level, a rendering buffer level and a decoding buffer level.

7. The multimedia client/server system of claim 1 wherein the video streaming performance signals include a decoding parameter.

8. The multimedia client/server system of claim 1 wherein the encoder module encodes the at least one multimedia signal in accordance with one of a Motion Picture Experts Group (MPEG) standard, and a Society of Motion Picture and Television Engineers (SMPTE) standard.

9. The multimedia client/server system of claim 1 wherein the RF server transceiver module and the RF client transceiver module communicate over a broadband wireless access network that conforms to at least one of the following standards: 802.11x, Ultra Wideband (UWB), and Worldwide Interoperability for Microwave Access (WiMAX).

10. The multimedia client/server system of claim 1 wherein the encoder module transcodes the at least one multimedia signal.

* * * * *